(12) United States Patent
Washington, II et al.

(10) Patent No.: US 8,884,228 B2
(45) Date of Patent: Nov. 11, 2014

(54) MODIFICATION OF SOLID STATE CDZNTE (CZT) RADIATION DETECTORS WITH HIGH SENSITIVITY OR HIGH RESOLUTION OPERATION

(75) Inventors: Aaron L. Washington, II, Aiken, SC (US); Martine C. Duff, Aiken, SC (US); Lucile C. Teague, Aiken, SC (US); Arnold Burger, Nashville, TN (US); Michael Groza, Hendersonville, TN (US)

(73) Assignees: Savannah River Nuclear Solutions, LLC, Aiken, SC (US); Fisk University, Nashville, TN (US)

( * ) Notice: Subject to any disclaimer, the term of this patent is extended or adjusted under 35 U.S.C. 154(b) by 217 days.

(21) Appl. No.: 13/359,730

(22) Filed: Jan. 27, 2012

(65) Prior Publication Data
US 2013/0193336 A1    Aug. 1, 2013

(51) Int. Cl.
*G01T 1/24*    (2006.01)
(52) U.S. Cl.
USPC ............... 250/339.06; 250/341.1; 250/370.13
(58) Field of Classification Search
USPC ......... 250/338.1, 338.4, 339.01, 339.06, 340, 250/341.1, 370.09, 370.13
See application file for complete search history.

(56) References Cited

U.S. PATENT DOCUMENTS

| | | | |
|---|---|---|---|
| 6,373,064 B1 | 4/2002 | Yao et al. | |
| 6,781,134 B1 | 8/2004 | Murray et al. | |
| 7,196,332 B2 | 3/2007 | Wear et al. | |
| 7,223,982 B1 | 5/2007 | Chen et al. | |
| 7,474,281 B2 | 1/2009 | Lin et al. | |

OTHER PUBLICATIONS

Burger et al., "Characterization of Large Single-Crystal Gamma-Ray Detectors of Cadmium Zinc Telluride", 2003, Journal of Electronic Materials, vol. 32, No. 7, pp. 756-760.*
R, Trioulet, T. Nguyen and A. Durand; THM, a breakthrough in $Hg_{1-x}Cd_x$ Te bulk metallurgy; J. Vac Sci. Technol. A 3(1), Jan./Feb. 1985, American Vacuum Society, pp. 95-99.
Minoru Funaki, Tsutomu Ozaki, Kazuyuki Satoh, Ryoichi Ohno; Growth and characterization of CdTe single crystals for radiation detectors; Nuclear Instruments and Methods in Physics Reserch a 436 (1999) 120-126.
Michael Groza, Henric Krawczynski, Alfred Garson, Jerrad W. Marton, Kuen Lee et al.; Investigation of the internal electic field in cadmium zinc telluride detectors using the Pockels effect and the analysis of charge transients; Journal of Applied Physics 2010; pp. 1-6.

\* cited by examiner

*Primary Examiner* — Mark R Gaworecki
(74) *Attorney, Agent, or Firm* — J. Bennett Mullinax, LLC

(57) ABSTRACT

An apparatus and process is provided to illustrate the manipulation of the internal electric field of CZT using multiple wavelength light illumination on the crystal surface at RT. The control of the internal electric field is shown through the polarization in the IR transmission image under illumination as a result of the Pockels effect.

6 Claims, 9 Drawing Sheets

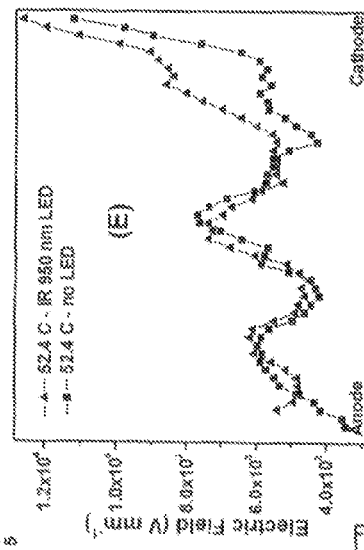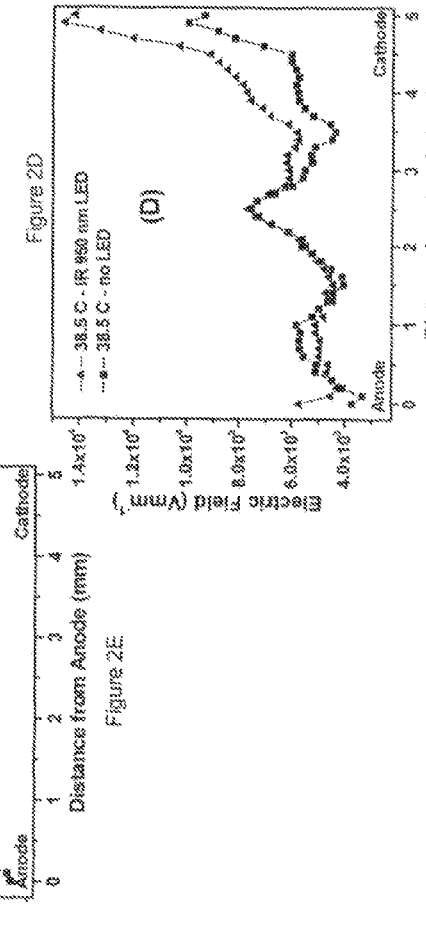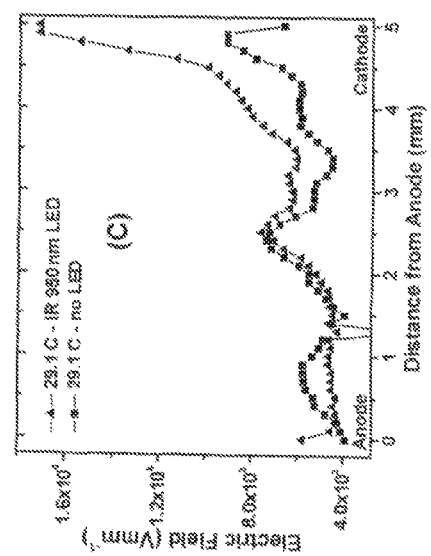
Figure 2A, Figure 2B, Figure 2C, Figure 2D, Figure 2E

| Bias (V) | Resolution with Pulser (%) | Resolution without Pulser (i.e. less Instrumental Noise) (%) | Optical Power (µW) | Collection Time (min) | Filter (nm) |
|---|---|---|---|---|---|
| +500 | 4.22 | 1.96 | 0.00 (no LED) | 30 | F950 |
| +500 | 4.51 | 1.80 | 9.92 | 30 | F950 |
| +500 | 5.12 | 1.78 | 43.50 | 30 | F950 |
| +500 | 3.92 | n/a (peak same as pulser- no noise) | n/a | 30 | F1000 |

Figure 6

MODIFICATION OF SOLID STATE CDZNTE (CZT) RADIATION DETECTORS WITH HIGH SENSITIVITY OR HIGH RESOLUTION OPERATION

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards an improvement in CdZnTe (CZT) based gamma radiation spectrometers. The invention is further directed towards an ability to manipulate the internal electrical field of a CZT material using multiple wavelength light illumination on the crystal surface. The invention is further directed to variation of wavelength illumination of the crystal to achieve a polarized electrical field within the CZT crystals. As a result, increased resolution of the spectrometer is achieved.

BACKGROUND OF THE INVENTION

Wide bandgap semiconductors like cadmium zinc telluride (CZT) have progressed in the last 20 years to become a promising material for gamma radiation spectrometers. The continued interest in CZT is attributed to its large absorption cross-section for gamma radiation due to high atomic number (stopping power) as well as its large bandgap that permits room temperature operation. The internal electric field in CZT crystals is highly dependent on the carrier and trap concentrations affecting both electron and hole mobility lifetime products (pr) which require a free path. The approximate bandgap of CdZnTe (with 10% Zn) is 1.6 eV which allows specific operation at room temperature without significant dark current and prevents excessive thermal generation of charge carriers. The ability to maintain a uniform electric field inside a CZT device is critical to optimal charge collection. If the actual distribution of the electric field differs significantly from that which is anticipated, the charge carriers may not flow as expected or may become trapped in vacancies or traps within the crystal.

Recent research into the uniformity of the internal electric field of single crystal CdZnTe and CdTe has been focused primarily on the infrared (IR) transmission data based on the Pockels effect. The Pockels effect is only observed in isotropic crystal structures, i.e., zinc-blended structures, due to their strong linear electro-optical coefficient. Some CZT crystals naturally exhibit a birefringence due to local defects and internal stresses that form during growth. However, the Pockels effect enhances the natural birefringence inherent in most materials allowing visualization of the internal electric field. The internal stress can be subtracted from the Pockels data by taking the difference between the transmission through the crystal with and without applied bias. Therefore, this technique is commonly used to determine the internal electric field of any CZT material while under bias to illustrate the electric field distribution in real time. This is accomplished by monitoring the changes in the electric field. Using this technique, a change in the electric field may be observed in response to external manipulations.

Examples of manipulations that can be performed on a crystal include exposure to light, magnetic fields, or physical stresses that have been applied to the surface. The efficiency of the carrier transport properties in CZT crystals is of great interest for the development of CZT based devices. In general, CZT materials typically exhibit hole transport mobility that is lower than electron transport mobility. However, in many cases, trapped charges in the crystal can affect both the hole and electron transport by as much as a factor of 10. By eliminating trapped charges in the low energy regime, both hole and electron transport efficiency can be increased throughout the entire volume of the crystal. In addition, an increase in the collection efficiency produces a higher signal to noise ratio. In the high energy regime, gamma sources produce excitation events in the entire bulk of the crystal. These events span the bulk of the crystal allowing higher collection volumes. The ability to eliminate carrier traps in the bulk would increase the overall charge transport in the crystal and also result in a change in the internal electric field of the crystal. This behavior could have a beneficial effect to several CZT utilized applications. Control of the internal electric field has previously been achieved using temperature to distort the internal carrier density near the cathode; however cryogenic temperatures were required to accomplish this feat. This also eliminates the advantage that CZT offers for room temperature operability.

Accordingly, there remains room for improvement and variation within the art.

SUMMARY OF THE INVENTION

It is one aspect of at least one of the present embodiments of the invention to provide for a CZT detector material having an improved charge collection capability.

It is a further aspect of at least one of the present embodiments of the invention to provide for a CZT detector in which a sub-band gap illumination is used to vary the internal electric field within the CZT crystal.

It is a further aspect of at least one of the present embodiments of the invention to provide for a process for enhancing performance of CZT crystals having inherent defects or secondary phases which, uncompensated for, limit efficiency of the CZT crystal-based detector.

It is a further aspect of at least one embodiment of the present invention to provide for a single CZT-based radiation detector in which a single CZT crystal may be used to search and locate radiation sources at great distances and thereafter, the CZT crystal may be illuminated with an infrared light emitting diode to increase the spectral resolution of the CZT detector for nuclear material identification.

It is a further aspect of at least one of the present embodiments in the invention to provide for a CZT-based detector having varying modes of operation wherein at least one mode of operation comprises the process of illuminating the detector with an infrared LED that is positioned over the CZT detector, thereby increasing the resolution of the detector.

It is a further aspect of at least one of the present embodiments of the invention to provide for a solid-state crystalline CZT detector in which the detector is selectively illuminated with infrared light having a wavelength of approximately 1000 nm.

It is a further aspect of least one embodiment of the present invention to provide for a CZT radiation detector in which the use of LED illumination allows for a reduction in a detector size, a reduction in detector power requirements, increased resolution of the detector when LED illuminated at 1000 nm, as well as a dual use of a single CZT detector having sensitivity to radiation in one mode and a second mode having the ability to characterize the radiation.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIGS. 2A-2E set forth electric field profiles for the Redlen 64039B sample and are plotted vs. the vertical distance on the crystal for both illuminated and non-illuminated samples. The profiles are plotted at different temperatures including (A) 15.1° C., (B) 23.0° C., (C) 29.1° C., (D) 38.5° C., and (E) 52.4° C. The cathode (−) is located at the bottom of the crystal where a −350 V bias is applied.

FIG. 6 sets forth a table and illustrates an increased sensitivity of a CZT detector illuminated with two different wavelengths of infrared including 950 nm and 1000 nm.

DESCRIPTION OF THE PREFERRED EMBODIMENT

Figure 1B:
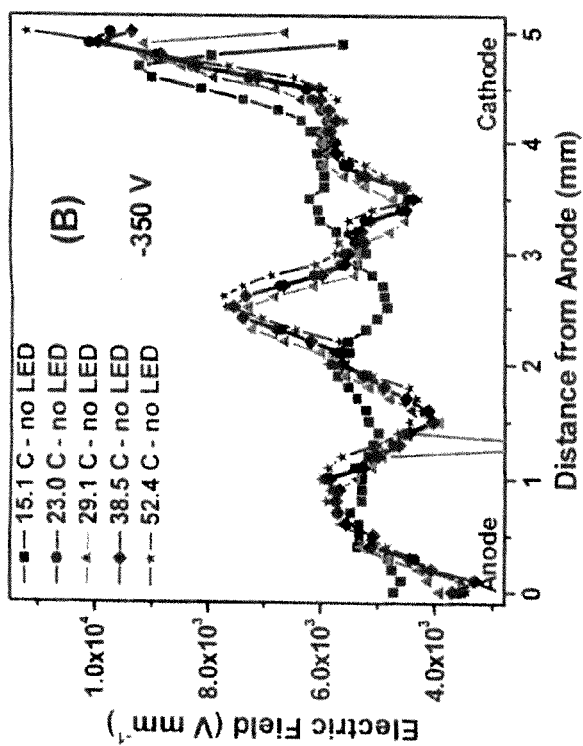
FIG. 1 set forth electric field profiles shown as electric field intensity vs. position on the crystal plot of the Redlen 64039B sample with illumination (A) and without illumination (B).

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Two CZT crystals used were grown by either the Traveling Heater Method (THM) denoted as "Redlen 64039B" or Modified Vertical Bridgman (MVB) method denoted as YT 3-7-8 with an incorporation of 10% Zn shown previously in Funaki et al., Nucl. Instrum. Methods Phys. Res. Sect. A-Accel. Spectrom. Dect. Assoc. Equip. 436, 120 (1999) and R. Triboulet, T. N. Duy, and A. Durand, J. Vac. Sci. Technol. A-Vac. Surf. Films 3, 95 (1985) both publications being incorporated herein by reference. The Redlen crystal was provided by Redlen Technologies (Victoria, B.C., Canada) and has the dimensions 9.93×10×4.5 mm$^3$. The Yinnel Tech (YT) crystal was purchased from Yinnel Tech, Inc. (South Bend, Ind., USA) and has the dimensions 12.1×11.3×6.48 mm$^3$.

Both crystals were polished with standard techniques down to a fine polish with 0.05 µm alumina. Thereafter, gold contacts were sputtered onto the crystal in a planar geometry to allow IR transmission data to be collected for Pockels analysis. The electron mobility lifetime ($\mu T_e$) measured without illumination for YT 3-7-8 was 0.0025(±5%) cm$^2$ V$^{-1}$ and was 0.0068(±5%) cm$^2$ V$^{-1}$ for the Redlen 64039 sample. The YT 3-7-8 sample had a bulk resistivity of 4.0×10$^{10}$ Ωcm and the Redlen 64039 sample was determined to have a bulk resistivity of 7.3×10$^{10}$ Ωcm. The Pockels setup used included an Electro-physics GaAs camera Model 8320 TE cooled and sensitive in the 900 to 1700 nm range, a Newport light source Model 66475 that was equipped with a 75 W high stability xenon arc lamp, an Andover IR narrow band filter P/N 115FS10-50 (bandpass of 1115±5 nm), and two Edmund Optics polarizers P/N NT48-889 covering a range of 1000 to 2000 nm with an extinction factor greater than 1000:1. An optical density filter (001) was used to reduce the incident light intensity down to 10% as needed to limit the generation of photo carriers. A Tenelec model TC 952 was used as the high voltage supply to bias the crystal. Circular polarizers were set at 45° and −45° with respect to the electric field on opposite sides of the crystal.

The 1115 nm lamp was set perpendicular with respect to the applied bias on the crystal. With no bias applied to the detector, an IR transmission image was taken with the polarizers in uncrossed position. After rotating the polarizers to a crossed position, a bias was then applied to the crystal and the Pockels image was taken. In addition, a LED was used in parallel to the applied electric field on the top face of the crystal.

The space charge field data was analyzed using the Scanning Probe Image Processor (SPIP™) software by Image Metrology where the spatial intensity was measured by comparison of intense versus dark regions; line profiles on the Pockels images, parallel to the electric field, were generated from the image processing software and track the brightness intensity. The electric field distribution was calculated from the Pockels image taken with the polarizers in the crossed position and the crystal biased as set forth in the description equation provided in the publication by M. Groza, H. Krawczynski, A. Garson, J. W. Martin, K. Lee, Q. Li, M. Beilicke, Y. L. Cui, V. Buliga, M. S. Guo, C. Coca, and A. Burger, J. Appl.

Phys. 107, 023704 (2010) and which is incorporated herein by reference. Further electric field distribution plots were from Pockels images that were taken with crossed polarizers with the crystal being unbiased and then biased at both polarities.

It is previously known that sub-bandgap illumination produces a lattice expansion ($\sim 10^{-4}$) in CZT detectors that increases at higher power. This expansion affects multiple properties including a decrease in the bandgap, a decrease in the refractive index, and an increase in the dielectric loss from the ionic nature of the polarizing effect of the light.

After the interaction with ionized radiation, a cloud of electron-hole pairs are generated briefly increasing the overall conductivity of the crystal. It is believed that the high concentration of impurities (i.e. V, Cl, Sn, Bi) in the grown ingot compared to native defects present in the crystal dictates that their electronic levels dominate the process of charge recombination and trapping. These impurities create deep levels that prevent shallow trapping from native defects created during the growth process. Upon the initial charging of the crystal, it is evident by the internal electric field distribution that the electron-hole pairs are readily trapped to deep lying energy levels. The holes are rapidly trapped ($t<10^{-6}$ s) to the deep lying energy levels where their signals cannot be collected by the read-out electrode. The photo-electrons are also partially trapped but their effect on the read-out is minor due to their longer lifetimes ($t=1$ to $5\times10^{-6}$ s). However, when illuminated, the hole and electrons that are trapped in mid-level trap states acquire the energy needed to be released and continue their movement through the crystal. The collection of space charge observed is physical evidence of the hole charge carriers being released and collected near the cathode (negative). The physical change in the electric field distribution based on the lack of hole trapping also implies that the electron carriers moving through the bulk are less likely to be trapped, except due to the native defects in the material.

It is previously known that as the temperature decreases, a collection of space charge is observed at the cathode near the surface of the crystal. Herein, we reported a similar accumulation of space charge near the cathode in the Pockels analysis upon irradiation on any face of the crystal with near IR light. In these studies, the difference in the electric field over a range of temperatures was measured both with and without IR illumination. Using this approach, the temperature vs. internal electric field was plotted both with and without illumination as shown in FIG. 1.

Figure 1A:
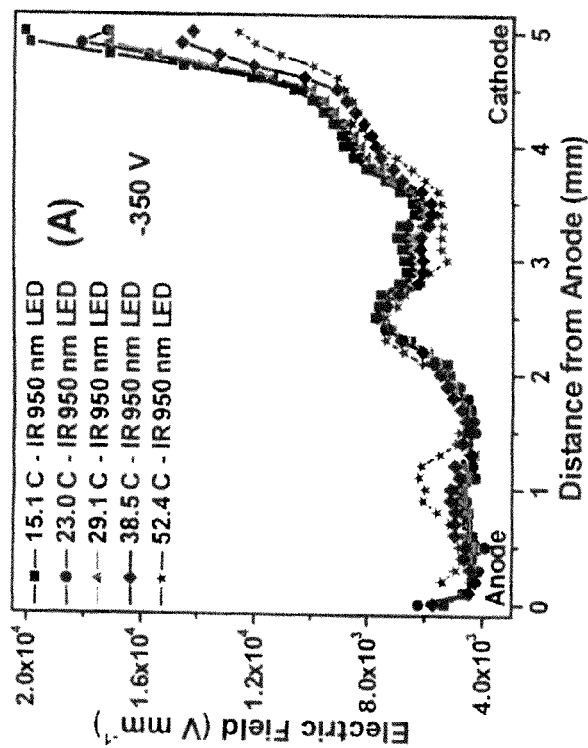
Figure 1D:
Figure 1C:
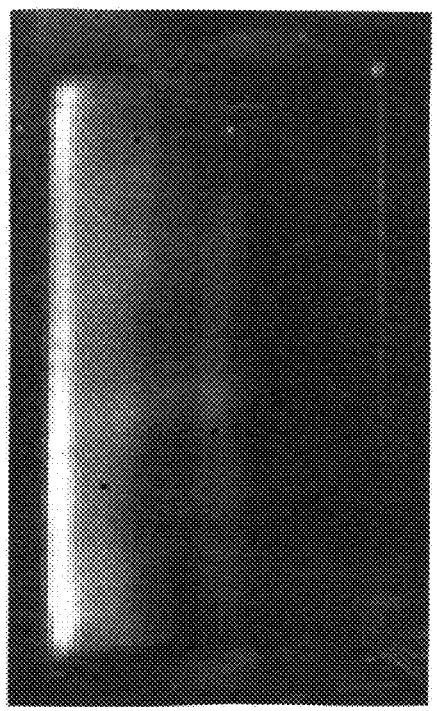

In FIG. 1*a*, with IR illumination, the electric field increased in magnitude near the cathode at all temperatures measured including 15 °C., 23 °C., 29.1° C., 38.5 °C., and 52.4 °C. Without IR illumination, as shown in FIG. 1*b*, a much smaller increase in magnitude at the cathode is seen solely due to the decrease in shot noise and thermal excitation at the lower temperatures.

The individual comparisons of the electric field distribution at each temperature with and without illumination are shown in FIG. 2. There is a significant increase in electric field near the cathode with illumination for every temperature except 52.4° C. (FIG. 2E). A steady decrease in difference between illumination and non-illumination is observed as the temperature increases. The temperature effect seen in the electric field is attributed to the decrease in carrier trapping with higher temperatures as previously shown.

Figure 3:
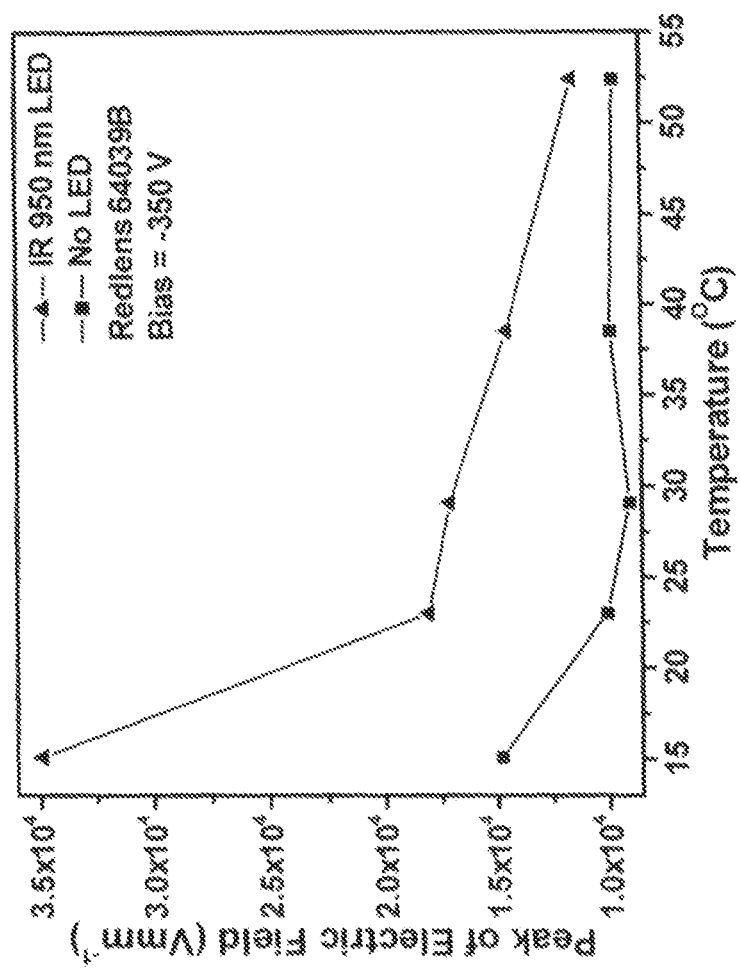
FIG. 3 sets forth the peak of the electric field density on the Redlen 64039B sample plotted versus temperature both with illumination (triangles) and without illumination (squares). The bias was maintained at −350 V applied to the cathode.

In FIG. 3, the higher temperatures of 38.5° C. and 52.4° C. reveal no change in the peak of the electric field without illumination. When illumination is applied, there is a slight increase in electric field as the temperature is decreased. At the lower temperatures of 29° C., 23° C., and 15° C., an exponential increase in the electric field can be observed when comparing the data between illuminated and un-illuminated. As the temperature decreases, a trend of increasing polarization is observed with a much greater slope than that which occurred due to changes in temperature. These data suggest that the polarization observed in the electric field was greater with illumination at all of the temperatures that were studied. There is no change in the electric field without illumination until the temperature reaches 15° C. where a large spike is observed. This increase in electric field indicates that there is a combinatory effect from the illumination and temperature. This conclusion is further supported by the significant increase in electric field at 15.1° C. with and without illumination of the crystal. This compound effect suggests that the temperature and IR illumination have similar but independent effects on the polarization of the electric field within the crystal resulting in a difference in the magnitude of polarization. The data demonstrates that IR light has a significant effect on the electric field within the temperature range that was studied.

Figure 4:
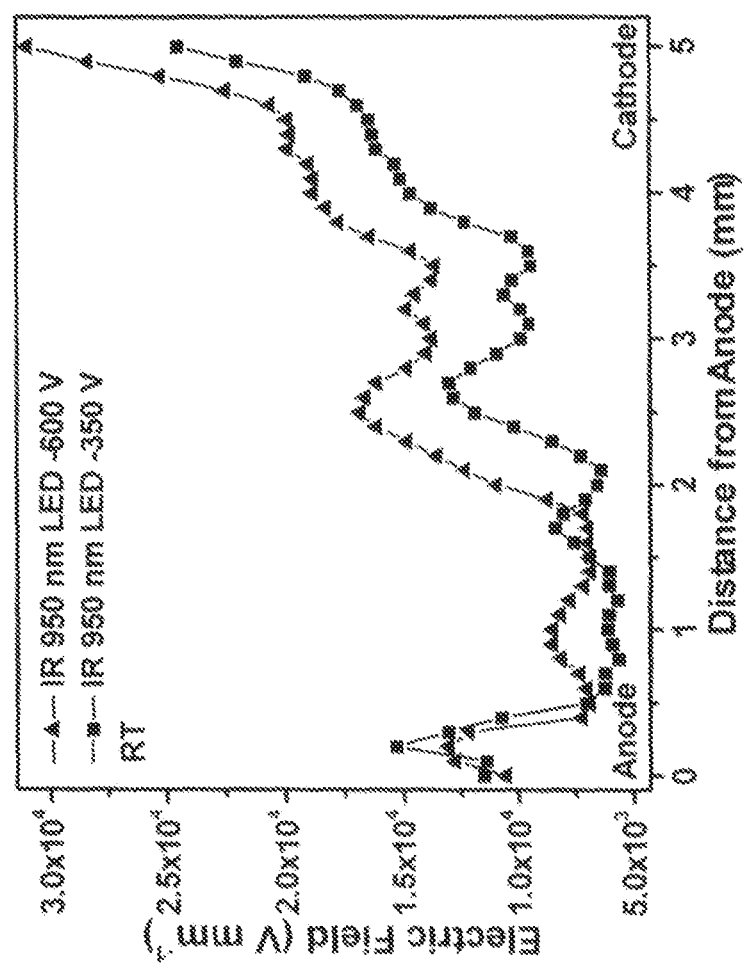
FIG. 4 sets forth the electric field profile of the Redlen 64039B sample plotted versus the vertical position on the crystal. The sample was illuminated with 950 nm light. The bias is applied to the bottom contact as −350 V (squares) and −600 V (triangles).

With illumination of the crystal, the electric field distribution at both low and high bias was also examined. High bias is typical of most commercial detectors so the maximum amount of charge carriers may be generated with each photon interaction. The higher bias generates a larger electric field in the crystal significantly increasing its charge collection. In FIG. 4, a comparison the electric field profiles of CZT at low and high bias under IR illumination is set forth to ascertain if there were disparities in the electric field distribution as a function of applied bias. The data shows that at higher bias, the electric field maintains a similar distribution though its intensity is slightly higher.

However, under high bias, it can be noted that a slight increase in the electric field is observed near the anode where the electric field was lower under low bias indicating the effects of bias on electric field intensity. This effect can be attributed to the increased number of carriers generated through the higher applied bias.

Figure 5:
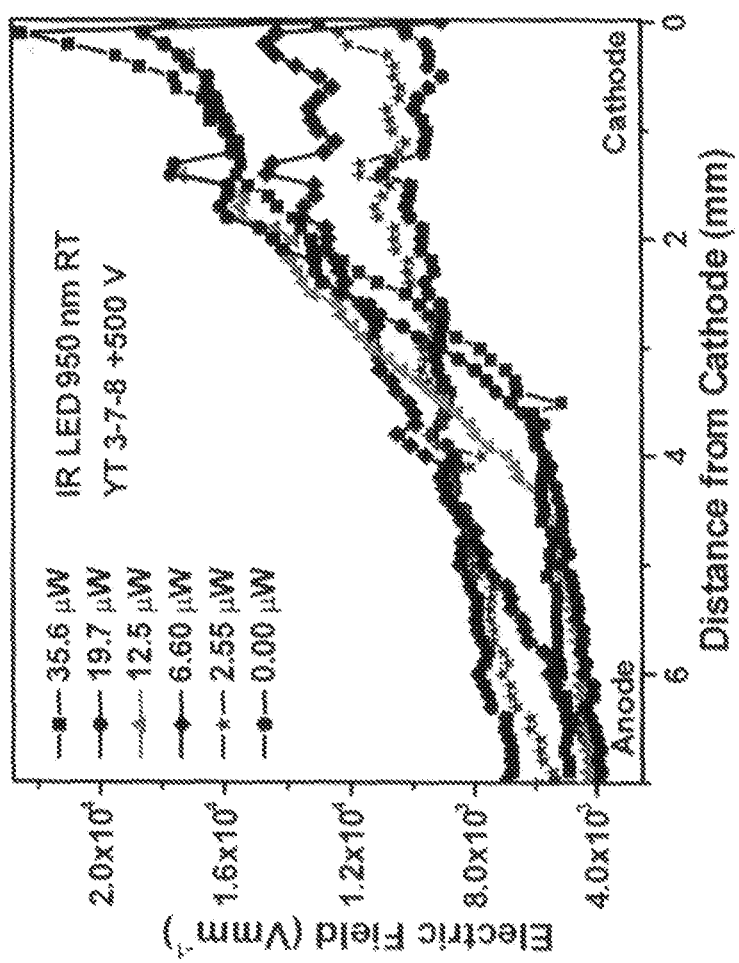
FIG. 5 sets forth the YT 3-7-8 sample at +500 V applied to the bottom contact (anode) and illuminated with 950 nm light. The power of the light was increased from 0.00 µW (pentagons), 2.55 µW (stars), 6.60 µW (diamonds), 12.5 µW (triangles), 19.7 µW (circles), and 35.6 µW (squares).

To measure the intensity dependent polarization of the electric field, a second crystal was used to illustrate the power progression of the electric field polarization and that this was not a crystal or growth specific phenomenon. In FIG. 5, the distribution of the internal electric field for YT 3-7-8 is measured at room temperature for increasing LED potential, which equals increasing illumination intensity on the crystal surface. The data reveal that the illuminated crystal shows a similar polarization toward the cathode at increasing magnitude that tracks the increasing illumination intensity. This correlates well with the Redlen sample that shows similar illumination response.

As seen in reference to FIG. 6, a pulse height resolution comparison table is provided showing values for a CZT detector illuminated with two different wavelengths of infrared light including 950 nm and 1000 nm. The detector has a single pixel contact geometry. Electronic noise from the experiment was a measured by a pulser which provided a background measurement. By subtracting the pulser from the response peak, one obtains the actual resolution of the pulse response.

It should be noted that while there is a slight improvement of using an LED to illuminate the crystal at 950 nm versus no illumination. The most optimal conditions occurred when the illumination wavelength was increased to 1000 nm at which point the peak becomes inseparable from the pulser. Accordingly, enhancement of the CZT detector resolution is achieved in going from a 950 nm illumination to a 1000 nm illumination.

The ability to polarize the electric field in CZT crystals has been shown previously using temperature solely. However, the present invention sets forth that IR illumination of the crystal has a similar, yet separate effect. The combination of temperature and illumination effects further contributes to the release of trapped charge and collection near the cathode. Sub-bandgap illumination was used in this study to free trapped charge carriers in the crystal and decrease carrier recombination due to holes trapped near the anode. This process also increased the mobility lifetime products (μT) by freeing trapped electrons and holes. It is expected that the wavelength of illumination chosen here will also limit a significant increase in background noise that is created by the exposure of the crystal to electromagnetic radiation near the bandgap energy through generating carriers via photo-excitation. It is possible that the illumination at this wavelength targets only the energy of the trap states thereby only releasing previously generated charge carriers without generating new ones. The present invention establishes that a CZT crystal, such as those used in radiation detectors, has improved properties when illuminated with infrared wavelength between 950-1000 nm. The increase in efficiency offers several advantages including ability to have cost savings in the amount of quality of CZT material that may be utilized in a detector. Further, improved efficiency may allow a reduction in the detector size in associated electronics which will allow for a more compact and economical detector. A further result of reduction in detector size in necessary electronics is a reduction of detector power requirements which will allow for greater portability and compact construction of detectors. The present invention also establishes an improved detector resolution when infrared LED light at 1000 nm is directed to the detector. The ability to positively impact detector resolution using infrared light offers the capability of where a CZT crystal material can be used in a radiation detector in two different modes. A first mode provides for standard sensitivity to radiation. A second mode, when illuminated by infrared light, increases the resolution of the CZT detector such that the detector can now be used to characterize the type of radiation. Heretofore, such capabilities have not been offered through use of a CZT radiation detector.

The modifications and changes to a CZT crystal substrate used within a detector may be utilized to modify a number of existing CZT detectors. For instance, U.S. Pat. No. 7,223,982 by Redlen Technologies provides for a semiconductor radiation detector can be modified in accordance with the present disclosure to bring about improvements to the detector set forth herein. U.S. Pat. No. 7,223,982 is incorporated herein by reference.

Additional CZT crystalline detectors are seen and described in reference to U.S. Pat. No. 7,196,332 assigned to General Electric and U.S. Pat. No. 6,781,134 assigned to University of California and both of which are incorporated herein by reference. The CZT detectors described in the above patents all provide for a radiation detector using a CZT sensor one having ordinary skill in the art may modify such detectors using the teachings described herein so as to bring about one or more of the stated improvements with respect to the CZT based detectors.

Figure 7:
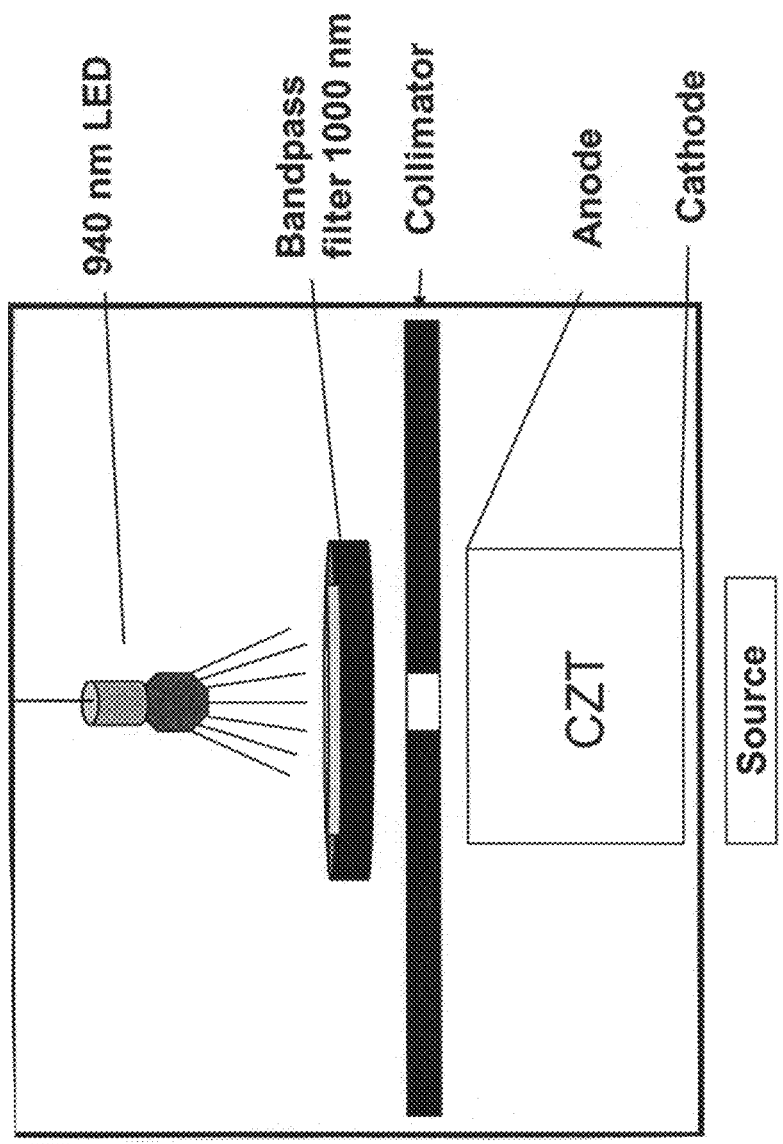
FIG. 7 sets forth a schematic diagram of a CZT detector having an infrared light source.
Figure 8:
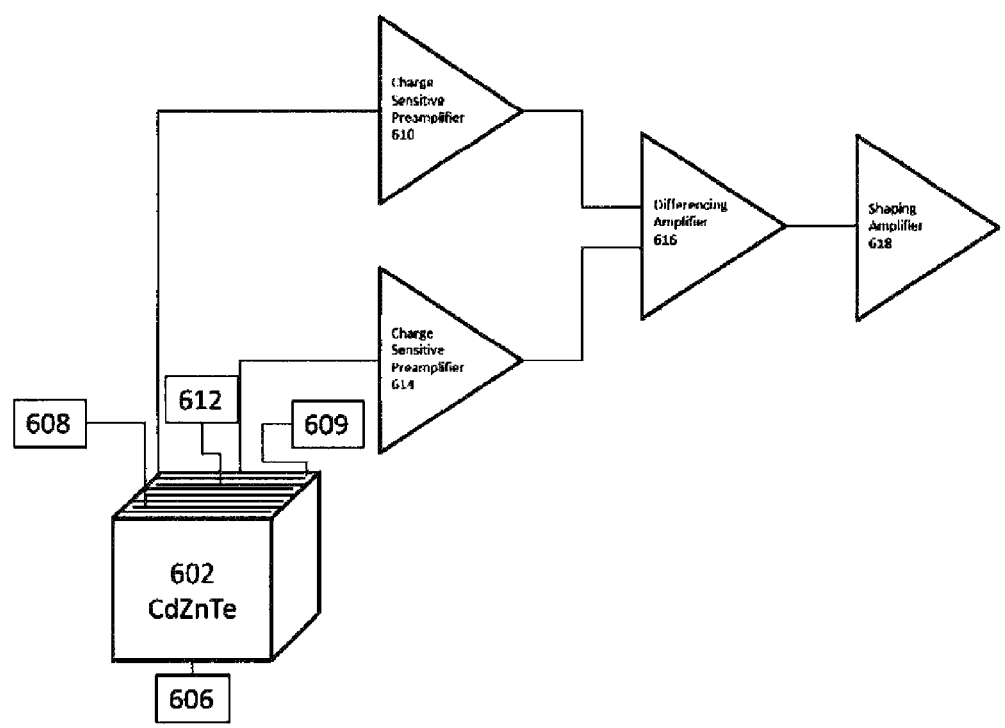
FIG. 8 is a further example of an alternative embodiment of a CZT detector showing placement of an infrared light source relative to the CZT detector material.

As set forth in FIGS. 7 and 8, are representative embodiments of a CZT detector as configured with an infrared light source. As illustrated in FIG. 7, an LED light source can be used having an appropriate filter to select a desired wavelength of light up to and including 1000 nm. As illustrated, it is believed useful to illuminate the CZT material such that illumination is in line with the electric field. As illustrated, illumination would be directed against the anode of the CZT material.

As best seen in reference to FIG. 8, a block diagram of one embodiment of a CZT gamma-ray sensor is provided in which the infrared radiation source 609 is illustrated in line with the electric field. The embodiment illustrated in FIG. 8 is similar to the CZT radiation detector as described in U.S. Pat. No. 6,781,134 and which is incorporated herein by reference.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. A process of increasing a resolution of a solid state crystalline CZT detector comprising the step of first operating the solid state crystalline CZT detector at a first resolution mode without exposure to infrared light and thereafter exposing the crystalline CZT material to a wavelength of 1000 nm, wherein the detector achieves higher sensitivity.

2. The process according to claim 1 wherein said step of exposing crystalline CZT material to infrared light further defines exposing the material to infrared light having a wavelength of 950-1000 nm.

3. The process of operating a solid state crystalline CZT detector comprising a first step of operating detector in the absence of an infrared light source by having a detector with a first resolution value;
   illuminating said crystalline CZT material in the detector to an infrared light source wherein the CZT detector can operate at a second resolution mode, the second resolution mode having greater resolution value than the first resolution value.

4. A device for detecting and identifying radioisotopes comprising;
   a cadmium zinc telluride (CZT) camera-ray sensor configured to produce gamma-ray data;
   a processor;
   an analyzer coupled to the gamma-ray sensor and processor, the analyzer configured to produce pulse height data corresponding to the gamma-ray data;
   a display component configured to display data on the analyzer so as to provide a visible indication of gamma-ray data;
   an infrared light source operatively engaging the CZT sensor so as to selectively illuminate the sensor with infrared light having a wavelength of about 1000 nm wherein, upon exposure of the CZT sensor to the infrared light, the sensor operates at a higher resolution mode for an identification of the gamma-ray source.

5. The apparatus according to claim 4 wherein the infrared light source is disengaged, the CZT detector operates at a higher sensitivity mode than when the infrared light source is on.

6. The apparatus according to claim 4 wherein the infrared illumination source is in line with an electrical field of the CZT detector.

\* \* \* \* \*